(12) United States Patent
Miyamoto

(10) Patent No.: US 6,414,954 B1
(45) Date of Patent: Jul. 2, 2002

(54) PICTURE PROCESSING SYSTEM AND METHOD

(75) Inventor: Atsushi Miyamoto, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 09/294,100

(22) Filed: Apr. 19, 1999

(30) Foreign Application Priority Data

Apr. 23, 1998 (JP) .......................................... 10-113052

(51) Int. Cl.[7] .............................................. H04L 12/56
(52) U.S. Cl. .................... 370/389; 370/487; 375/240.01
(58) Field of Search ................................. 370/229, 230, 370/389, 392, 393, 487, 490, 349, 348, 493, 494, 495, 474; 348/14.11; 375/240, 240.01

(56) References Cited

U.S. PATENT DOCUMENTS

| | | | |
|---|---|---|---|
| 5,917,830 A | * | 6/1999 | Chen et al. .................. 370/487 |
| 6,088,357 A | * | 7/2000 | Anderson et al. ........... 370/392 |
| 6,115,422 A | * | 9/2000 | Anderson et al. ........... 370/240 |
| 6,229,801 B1 | * | 5/2001 | Anderson et al. ........... 370/349 |

FOREIGN PATENT DOCUMENTS

| | | |
|---|---|---|
| JP | 293837/1998 | 12/1987 |
| JP | 275147/1996 | 10/1996 |
| JP | 307865/1997 | 11/1997 |

OTHER PUBLICATIONS

Eizo Joho Media Gakkai Gijutsu Hokoku, 1998 vol. 22, No. 8, pp. 33–40.

* cited by examiner

Primary Examiner—Ricky Ngo
Assistant Examiner—Phuc Tran
(74) Attorney, Agent, or Firm—Scully, Scott, Murphy & Presser

(57) ABSTRACT

A picture processing system includes a host CPU for storing a series of PID values for packets to be processed, a next PID register, a present PID register, and a header processor for extracting packets in the transport stream specified by the present PID value stored in the present PID register and removing a header from the extracted packet to output payload data for decoding. When a splicing point is detected between groups of packets, a PID switch signal is generated to replace the present PID value with the next PID value.

7 Claims, 3 Drawing Sheets

PICTURE PROCESSING SYSTEM AND METHOD

BACKGROUND OF THE INVENTION (a) Field of the Invention

The present invention relates to picture processing system and method and, more particularly, to a technique for processing picture signals, which is capable of extracting desired video data and/or audio data from input transport stream.

(b) Description of the Related Art

A picture processing system is generally used in a television set, which receives video packets and/or audio packets from a specified one of a plurality of transmission channels. FIG. 1 shows a conventional picture processing system in a block diagram. The picture processing system includes a data separator 40, a host computer (CPU) and a MPEG audio/video (AV) decoder 42. The data separator 40 includes a register block 43 including a video PID register 45 and an audio PID register 46, and a TS header processor 47. The term "PID" is the abbreviation of "packet identification data", which includes 13 bits in payload of packets transmitted as a transport stream. In the decode-processing of the transport stream by the picture processing system, the payload data is judged by examining the value in the PID as to the type and the channel of the payload, namely whether the payload data is a video data or an audio data and to which channel the payload data belongs.

The host CPU 41 specifies a series of payload data to be processed by the TS header processor 47 by storing a PID value in each of the video PID register 45 and the audio PID register 46. The MPEG AV decoder 42 receives video/audio data in the MPEG format supplied from the TS header processor 47 to decode the video/audio data for each of the picture frames.

Each of the video PID register 45 and the audio PID register 46 stores a value for the PID of the TS packet to be extracted from the input transport stream TS based on the signal supplied from the host CPU 41. The TS header processor 47 selects and extracts a TS packet each having the specified PID value set in the video PID register 15 or the audio PID register 46, then separates the payload data from the TS packet and delivers the separated payload data to the MPEG AV decoder 42.

The TS header processor 47 outputs a splicing point signal when the TS header processor 47 detects a splicing point which is disposed between adjacent groups of packets in the transport stream for indicating a switch of picture frame, for example.

The splicing point signal is supplied to the host CPU 41 to generate an interruption for the operation of the CPU 41. The host CPU 41 changes the settings in the video PID register 45 and the audio PID register 46 upon the interruption. By these procedures, the PID value for identifying the TS packet to be extracted by the TS header processor 47 is switched to a next PID. In a practical case, the change of the PID in the transport stream occurs when the broadcasting station switches its data between a drama picture and an advertising picture, for example. The value for PID of the payload data to be processed is specified in menu information or a program list in the input transport stream before each group of payload data to be processed reaches the TS header processor 47.

In the conventional picture processing system as described above, the host CPU 41 changes the settings in the video PID register 45 and the audio PID register 46 immediately after the host CPU 41 receives the interruption. More specifically, the host CPU 41 must immediately respond to the interruption having a high priority when the host CPU 41 is informed of the PID switching. This processing is a heavy burden to the host CPU 41. In addition, if a time lag occurs between the generation of the splicing point signal and processing by the host CPU 41 for the interruption, which sometimes occurs in a practical case, the entire screen exhibits white at a moment because no payload data is decoded.

SUMMARY OF THE INVENTION

It is therefore and object of the present invention to provide a picture processing system and a method therefor capable of reducing the burden of the host CPU upon the PID switching and operating the host CPU to switch the PID in real time, thereby avoiding the occurrence of no picture signal processing.

The present invention provides a picture processing system for processing a transport stream including a plurality of groups of packets and a splicing point for separating each two of the groups, each of the groups having payload data in the respective packets and a packet identification data (PID) for each of the groups, the picture processing system comprising a PID data storage section for storing a series of PID values corresponding to groups of packets to be processed, a next PID register for storing a next PID value corresponding to a next group of the packets, a present PID register for storing a present PID value corresponding to a present group of the packets to be processed, and a header processor for receiving the transport stream to output the payload data of packets each having a PID value which coincides with the present PID value, the header processor detecting the splicing point to output a PID switching signal, the next PID register responding to the PID switching signal to replace the next PID value with a following PID value following to the next PID value stored in the PID data storage section, the present PID register responding to the PID switching signal to replace the present PID value with the next PID value stored in the next PID register.

The present invention also provides a method for processing a transport stream including a plurality of groups of packets and a splicing point for separating each two of the groups, each of the groups having payload data in the respective packets and a packet identification data (PID) for each of the groups, the method comprising the steps of storing a series of PID values corresponding to groups of packets to be processed, storing a next PID value corresponding to a next group of the packets and a present PID value corresponding to a present group of the packets to be processed, detecting the splicing point to output a PID switching signal, replacing the present PID value with the next PID value, and receiving the transport stream to output the payload data of packets each having a PID value which coincides with the present PID value.

In accordance with the picture processing system and the method of the present invention, the switching of the PID value can be performed in real time by setting beforehand the next PID value to be stored next in the present PID register.

The above and other objects, features and advantages of the present invention will be more apparent from the following description, referring to the accompanying drawings.

PREFERRED EMBODIMENT OF THE INVENTION

Figure 1:
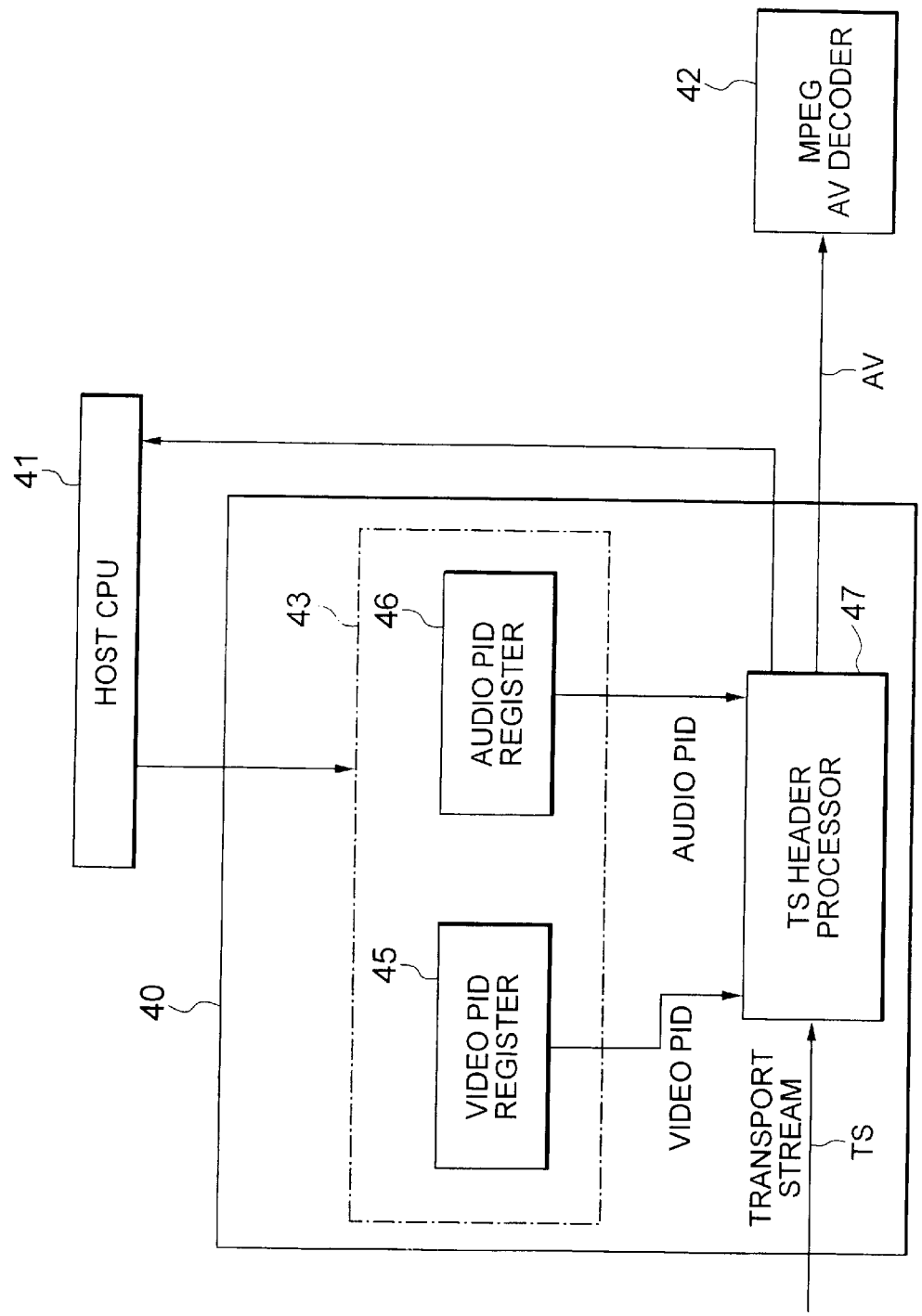
FIG. 1 is a block diagram of a conventional picture processing system.
Figure 2:
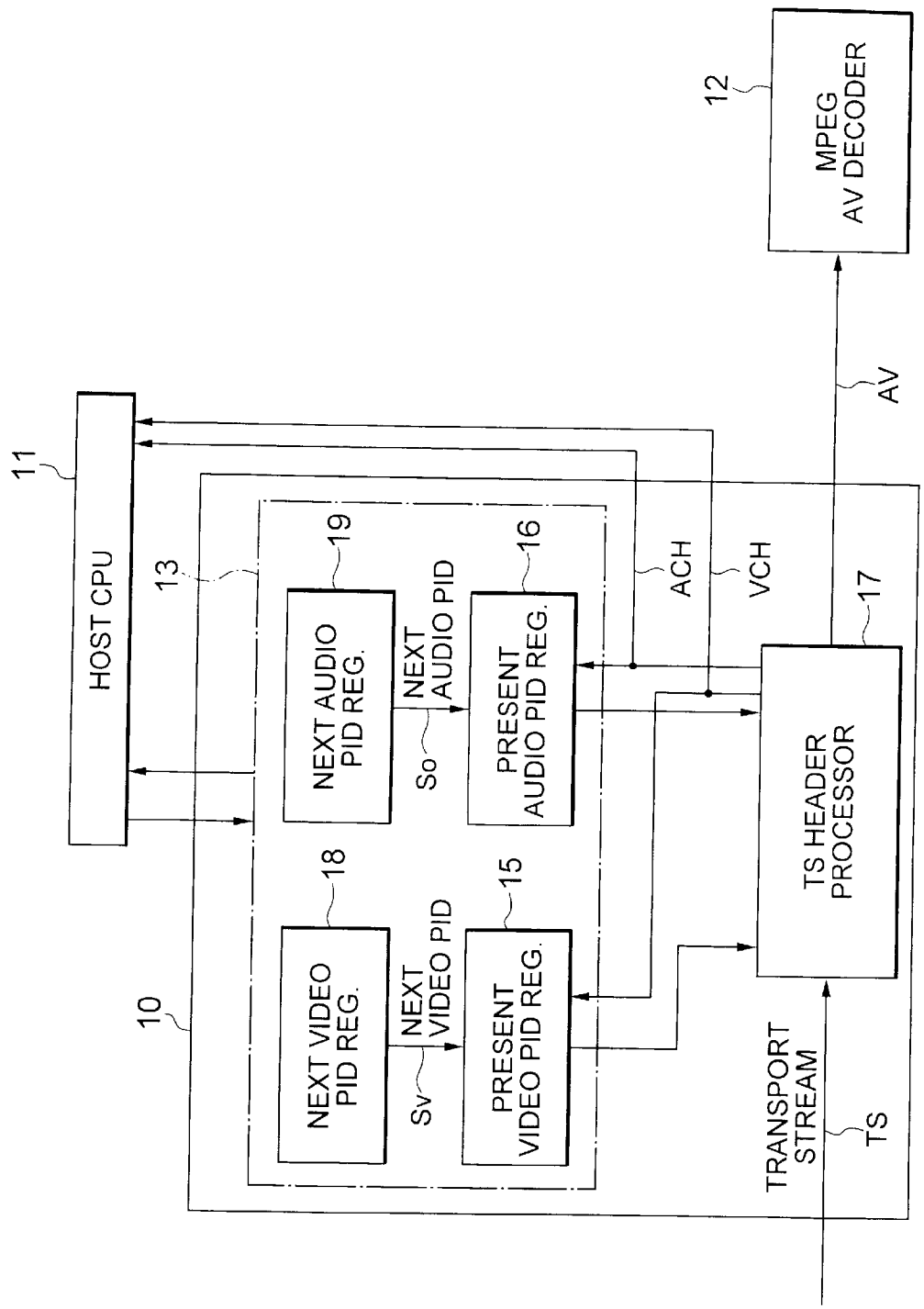
FIG. 2 is a block diagram of a picture processing system according to an embodiment of the present invention.

Now, the present invention is more specifically described with reference to accompanying drawings. Referring to FIG. 2, a picture processing system according to an embodiment of the present invention is capable of storing menu information or a program list in the transport packet that indicates a series of PID values of the TS packets to be processed in the processing system, extracting the TS packets each having a PID value specified in the menu information or program list from the transport stream, and composing the payload data of TS packets as a series of data to be displayed on a screen after decoding thereof.

The picture processing system includes a data separator 10 for processing an input transport stream TS to output video/audio data AV, a host CPU 11 for controlling the processing by the data separator 10, and a MPEG AV decoder 12 for decoding the video/audio data AV supplied from the data separator 10. The data separator 10 includes a register block 13 and a TS header processor 17. The register block 13 includes a present video PID register 15 for storing a present video PID value, a next video PID register 18 for storing a next video PID value, a present audio PID register 16 for storing a present audio PID value, and a next audio PID register 19 for storing a next audio PID value. The host CPU 11 sets the next PID value in each of the next PID registers 18 and 19, which loads the present PID registers 15 and 16, respectively, with the next PIDs after the next PIDs become the present PIDs.

The TS header processor 17 extracts TS packets each having a PID which coincides with the PID value stored in the present video PID register 15 and/or the present audio PID register 16. The TS header processor then separates the payload data from the extracted TS packets and delivers the payload data to the MPEG AV decoder as a series of video/audio outputs AV in a MPEG format.

The TS header processor 17 judges the value specified by the video splice count down signal VCD in the transport stream TS if it is attached to a TS packet, and outputs a video PID switch signal VCH to the host CPU 11 and the video PID register 15 at the timing of the video splicing point. The TS header processor 17 judges also the value specified by the audio splice count down signal ACD in the transport stream TS if it is attached to a TS packet, and outputs an audio PID switch signal ACD at the timing the next audio splicing point to the host CPU 11 and the audio PID register 16.

The host CPU 11 rewrites the next video PID value stored in the next video PID register 18 based on the menu information in response to a video PID switch signal, by outputting a first setting signal representing a following video PID value following the next video PID value. The next video PID register 18 stores the first setting signal until it is loaded to the present video PID register 15.

The host CPU 11 rewrites also the next audio PID value stored in the next audio PID register 19 in response to the audio PID switch signal based on the menu information, by outputting a second setting signal representing a following audio PID value following the next audio PID value. The next audio PID register 19 stores the second setting signal until it is loaded to the present audio PID register 16.

The present video PID register 15 receives the first setting signal from the next video PID register 18 in response to the video PID switch signal VCH and sets the video PID value therein. The present audio PID register 16 receives the second setting signal from the next audio PID register 19 in response to the audio PID switch signal ACH and sets the audio PID value therein. Thus, the present PID value of the video/audio TS packet to be extracted by the TS header processor 17 is switched to the video/audio PID value specified by the first/second setting signal.

The MPEG AV decoder 12 receives video/audio packet AV in the MPEG format output from the TS header processor 17, and outputs the video/audio packets while decoding the same one by one.

Figure 3:
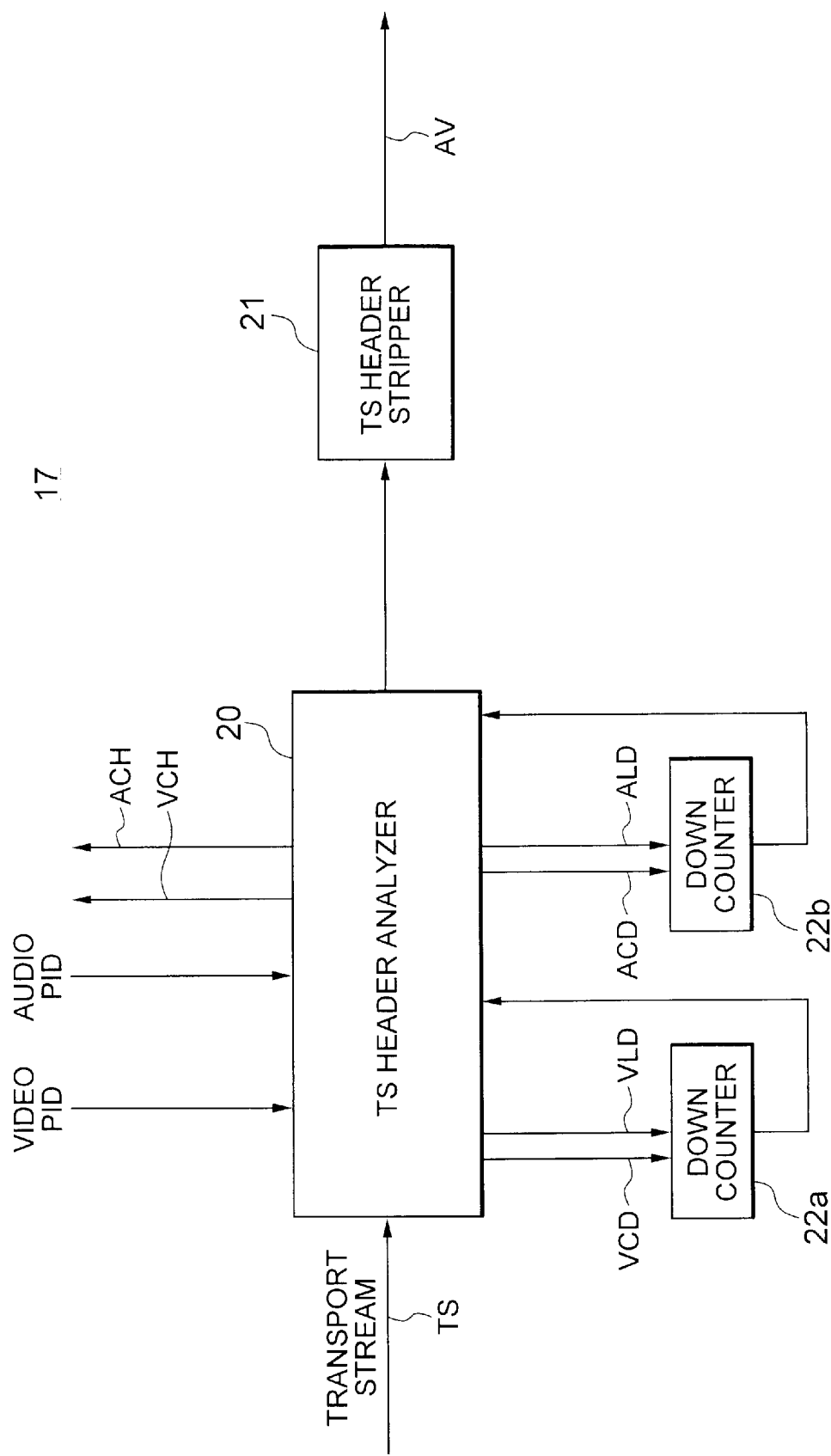
FIG. 3 is a block diagram of the TS header processor shown in FIG. 2.

Referring to FIG. 3, the TS header processor 17 in the picture processor system shown in FIG. 2 includes a TS header analyzer 20, a TS header stripper 21, and a pair of 7-bit down counters 22a and 22b.

The TS header analyzer 20 compares the PID of each TS packet in the input transport stream TS with the present video/audio PID value which is set based on the menu information in the transport stream input to the CPU 11 beforehand, and then outputs to the TS header stripper 21 a TS packet having a PID which coincides with the video/audio PID value set in the respective present PID registers 15 and 16.

The TS header analyzer 20 analyzes the count of the video/audio splice count-down signal of the TS packet to be supplied to the TS header stripper 21, if the present TS packet includes the video/audio splice count-down signal. The count of the splice count-down signal indicates the status of the present TS packet: a count "0" indicates that the present TS ok packet is the last one of a group of packets, a count "5" indicates that the present TS packet is followed by other five TS packets in the same group. In general, a negative value is also used for the count of the splice count-down signal; however, the negative value is not utilized in the present embodiment.

Based on the count of the splice count-down signal in the transport stream, the TS header analyzer 20 executes as follows:

(1) The TS header analyzer 20 does not execute any processing if the count is negative;

(2) The TS header analyzer 20 immediately outputs a video switch signal VCH and/or an audio switch signal ACH to the host CPU 11 and the next video PID register 18 and/or the next audio PID register 19 if the count is "0", and (3) The TS header analyzer 20 loads the down counter 22a and/or 22b with the less significant 7 bits of the splice count-down signal VCD/ACD, then controls the down counter 22a and/or 22b by a load decrement signal VLD/ALD to decrement the count in the down counter 22a and/or 22b. If the count in the down counter 22a and/or 22b becomes "0" after the decrements, the TS header analyzer 20 executes as recited in the above item (2).

The TS header stripper 21 removes TS headers from the video/audio TS packet input from the TS header analyzer 20, and outputs the audio/video PES packet or payload data to the MPEG AV decoder 12 in FIG. 2.

In the configuration as described above, the switching of the video/audio PID can be performed based on the data stored in the next video/audio PID registers 18 and 19, thereby executing the switching of the video/audio PID in real time. This removes a malfunction in that the screen exhibits white at a moment due to no packet data.

Since the above embodiments are described only for examples, the present invention is not limited to the above embodiments and various modifications or alterations can be easily made therefrom by those skilled in the art without departing from the scope of the present invention.

What is claimed is:

1. A picture processing system for processing a transport stream including a plurality of groups of packets and a splicing point for separating each two of said groups, each of said groups having payload data in respective said packets and a packet identification data (PID) for each of said groups, said picture processing system comprising a PID data storage section for storing a series of PID values corresponding to groups of packets to be processed, a next PID register for storing a next PID value corresponding to a next group of said packets, a present PID register for storing a present PID value corresponding to a present group of said packets to be processed, and a header processor for receiving said transport stream to output said payload data of packets each having a PID value which coincides with the present PID value, said header processor detecting said splicing point to output a PID switching signal, said next PID register responding to said PID switching signal to replace said next PID value with a following PID value following to said next PID value stored in said PID data storage section, said present PID register responding to said PID switching signal to replace said present PID value with said next PID value stored in said next PID register.

2. The picture processing system as defined in claim 1, wherein said payload data includes video data and/or audio data, said next PID register includes a video PID register section and an audio PID register section.

3. The picture processing system as defined in claim 1, wherein said PID data storage section receives said series of PID data from said transport stream.

4. The picture processing system as defined in claim 1, wherein said header processor comprises a count-down counter for counting down in response to said PID switching signal.

5. The picture processing system as defined in claim 1, wherein a count-down counter is reset to an initial count based on a splice count-down signal supplied in said transport stream.

6. The picture processing system as defined in claim 1, wherein said header processor comprises a header analyzer for analyzing said PID of each said packet data, and a header stripper for removing said PID from said payload data when said PID coincides with said present PID value.

7. A method for processing a transport stream including a plurality of groups of packets and a splicing point for separating each two of said groups, each of said groups having payload data in respective said packets and a packet identification data (PID) for each of said groups, said method comprising the steps of storing a series of PID values corresponding to groups of packets to be processed, storing a next PID value corresponding to a next group of said packets and a present PID value corresponding to a present group of said packets to be processed, detecting said splicing point to output a PID switching signal, replacing said present PID value with said next PID value, and receiving said transport stream to output said payload data of packets each having a PID value which coincides with the present PID value.

* * * * *